US006478289B1

(12) United States Patent
Trewin

(10) Patent No.: US 6,478,289 B1
(45) Date of Patent: Nov. 12, 2002

(54) APPARATUS AND METHODS FOR CONTROLLING THE SUPPLY OF WATER MIST TO A GAS-TURBINE COMPRESSOR

(75) Inventor: Richard Robert Trewin, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/707,247

(22) Filed: Nov. 6, 2000

(51) Int. Cl.⁷ .................................................. B01F 3/04
(52) U.S. Cl. .................... 261/27; 261/37; 261/DIG. 34; 60/39.53
(58) Field of Search .............................. 261/26, 27, 37, 261/67, 128, 129, 130, 131, 135, 137, DIG. 34; 60/39.53, 39.59

(56) References Cited

U.S. PATENT DOCUMENTS 5,809,981 A * 9/1998 Berg-Sonne ................ 123/563
5,867,977 A * 2/1999 Zachary et al. ............ 60/39.53
6,250,064 B1 * 6/2001 Tomlinson et al. ........ 60/39.05
6,260,350 B1 * 7/2001 Horii et al. .................. 60/39.3

* cited by examiner

Primary Examiner—C. Scott Bushey
(74) Attorney, Agent, or Firm—Nixon & Vanderhye

(57) ABSTRACT

A water droplet mist is sprayed into the air upstream of the gas-turbine compressor inlet to increase power output from the gas turbine. The water has the effect of lowering dry-bulb temperature of the air entering the compressor inlet. To supply an amount of water appropriate for anticipated ambient conditions, a plurality of different capacity pumps are provided to supply water over a wide range of water flow rates. The control system for the pumps avoids the use of a set-point temperature for the inlet air obtained from measurements taken downstream of water injection. The operator inputs a desired relative humidity of air entering the compressor, and the control system determines the appropriate flow rate of water using the following measurements: flow rate of dry air to the compressor; flow rate of inlet water; dew point temperature of the inlet air; dry-bulb temperature of the inlet air; and temperature of the inlet water.

6 Claims, 1 Drawing Sheet

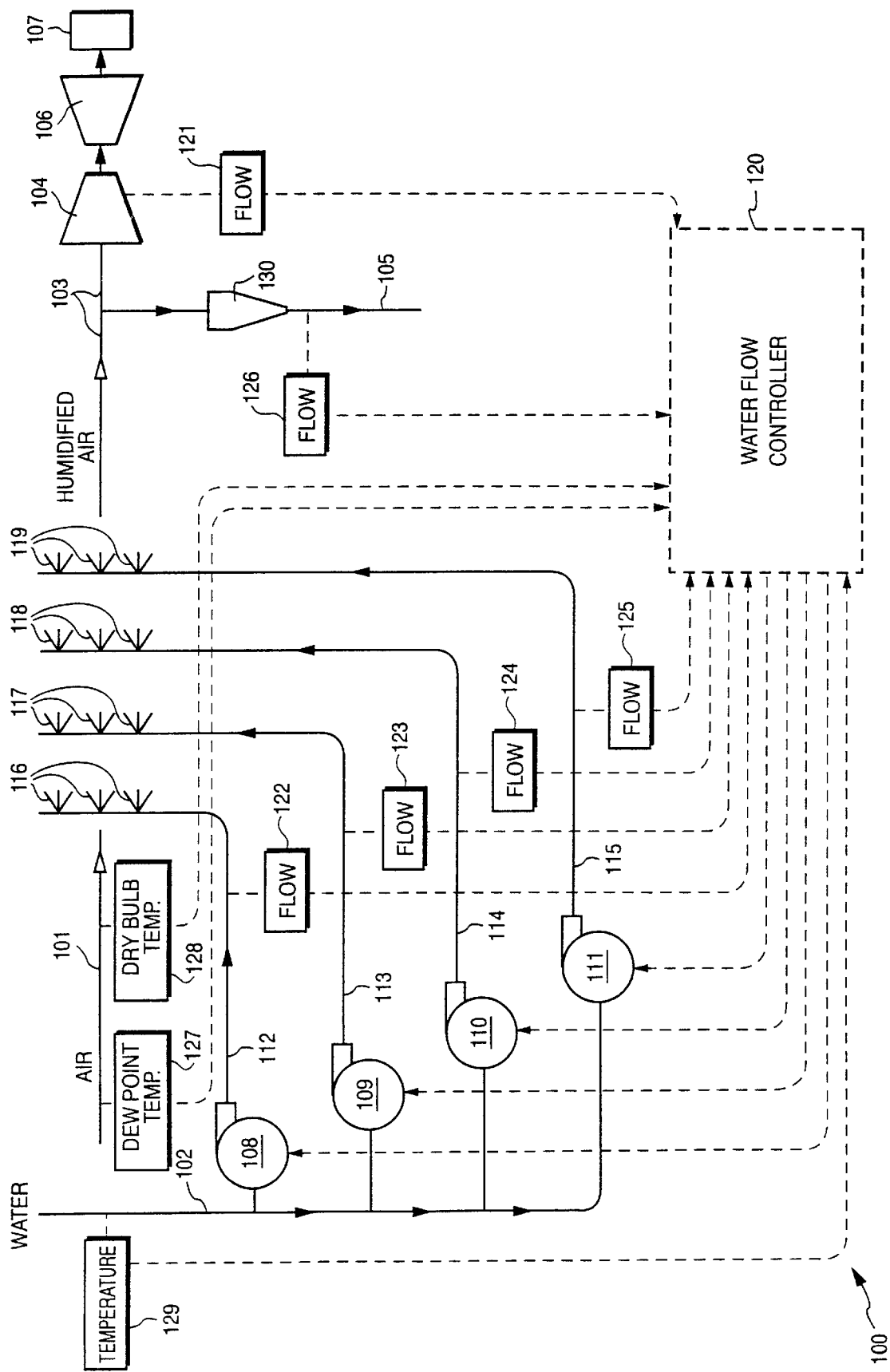

APPARATUS AND METHODS FOR CONTROLLING THE SUPPLY OF WATER MIST TO A GAS-TURBINE COMPRESSOR

BACKGROUND OF THE INVENTION

The present invention relates to a gas turbine system and, in particular, a system for humidifying air supplied to the compressor using measurements of upstream conditions of air and water and the known flow rate of air through the turbine.

It is well known that power output from a gas turbine may be increased by spraying a fine mist of water droplets into the air upstream of the gas turbine compressor inlet. The water has the effect of lowering the temperature of the air supplied to the compressor inlet.

The general practice of manufacturers of systems that supply a fine mist of water to an air stream of a compressor inlet is to use several water pumps of the same size, individually or together. The flow rate of water can be set equal to the flow rate of any individual pump or to the sum of the flow rates from two or more pumps. Also, the flow rate may be varied through a system of control and bypass valves. The water flow control conventionally uses the measurement of the dry-bulb temperature of the air stream at a location downstream of the water injection. This practice is unreliable because any temperature sensor that is downstream of the water injection is prone to be impacted by water droplets, which cause the temperature measurement to be skewed toward the wet-bulb temperature. Additionally, the water temperature to the misters is assumed to be the same as the wet-bulb temperature of the air, i.e., the evaporation process is assumed to occur at the wet-bulb temperature of air.

BRIEF SUMMARY OF THE INVENTION

In accordance with a preferred embodiment of the present invention, a system is provided for controlling desired flow rate of water to the misters without a temperature measurement downstream of the misters. This invention measures the temperatures of inlet air and inlet water upstream of the misters and, together with the known value of the flow rate of humidified air supplied to the compressor inlet and analysis of the mass- and heat-transfer processes, the flow rate of water supplied to the misters is determined. The inaccuracies inherent in the above-described prior art process are avoided.

Particularly, the magnitude of water to be added to the air stream is determined through the use of measured dry-bulb temperature and a measure of humidity such as dew point temperature, relative humidity or wet-bulb temperature of the ambient air upstream of the misters, together with the known value of the water temperature and the air flow rate. The method involves a determination of the humidity ratio (the mass of water vapor divided by the mass of dry air) of the upstream ambient air flow from the dry-bulb and dew point temperatures. The method also involves determination of the humidity ratio of saturated air at the desired downstream conditions where the water is completely evaporated. The difference between the humidity ratio of the upstream air and the humidity ratio of the downstream saturated air, or some user-defined fraction of this difference, is used to calculate the required flow rate of misted water per unit flow rate of air. These flow rates are expressed as mass per unit of time. Finally, the total flow rate of misted water is calculated from the known flow rate of misted air and the required flow rate of water per unit flow rate of air.

More particularly, the operator specifies the relative humidity of the air entering the compressor, e.g., 99% relative humidity. The required distance and the flow rate of water that creates the desired conditions for the downstream air involves an analysis of the heat- and mass-transfer processes, which are modeled using Film Theory. Since the processes are interdependent, this calculation involves an iterative solution. The heat- and mass-transfer processes result in a process of cooling the air stream that is similar to a constant wet-bulb process. In fact, the heat- and mass-transfer process is identical to a constant wet-bulb process when the water is delivered to the air stream at the wet-bulb temperature of the air. However, the present invention enables the water to be delivered to the air at a temperature greater than or less than the wet-bulb temperature without assuming the temperatures are the same. The Film Theory solution depends on the flow rate of the water, the temperature of the misted water, the diameter distribution of the water droplets, the humidity of the inlet air, the flow rate of the inlet air, the linear velocity of the inlet air, and the temperature of the inlet air. The mass-transfer models the evaporation of water before reaching the compressor. Also, the heat-transfer process is adiabatic, which yields a corresponding energy balance. The energy balance depends on the flow rate of the inlet air, the humidity of the inlet air, the dry-bulb temperature of the inlet air, the temperature of the inlet water, the flow rate of the inlet water and the humidity of the air entering the compressor. Using the mass-transfer relationship and the energy balance given by Film Theory, the flow rate of misted water and the required distance for complete evaporation is determined from a relative humidity specified by the operator.

In a preferred embodiment hereof, the water is delivered to the air stream through a system of pumps, each of which is a different size. The second-smallest pump delivers water at twice the flow rate of the smallest pump. The third-smallest pump delivers water at twice the flow rate of the second-smallest pump. The fourth-smallest, e.g., the largest, pump has a variable speed control, such that the flow rate may be varied arbitrarily. In this way, the flow rate of water can be set to any value between the maximum capacity of the pumps and one-half the capacity. Flow rates less than one-half the maximum capacity can be set to increments of the smallest pump by turning on individual pumps.

In a preferred embodiment according to the present invention, there is provided in a control system for a water mister in a gas turbine having a compressor, an inlet to the water mister for receiving air, and an inlet to the water mister for receiving water, a method for providing humidified air to the compressor comprising the steps of determining a flow rate of water supplied to the water mister to humidify air supplied to the compressor to a predetermined relative humidity by sensing at least one property of the air in the air inlet to the water mister.

In a further preferred embodiment according to the present invention, there is provided in a control system for a water mister in a gas turbine having a compressor, an inlet to the water mister for receiving air, and an inlet to the water mister for receiving water, a method for providing humidified air to the compressor, comprising the steps of sensing at least one property of the air supplied to the water mister and controlling the flow rate of water supplied to the water mister to humidify air supplied to the compressor to a predetermined relative humidity in accordance with the sensed property.

In a still further preferred embodiment according to the present invention, there is provided an apparatus for supplying humidified air to a compressor in a gas turbine, comprising a water mister, an inlet to the water mister for receiving air, an inlet to the water mister for receiving water, sensors for determining the temperature and humidity of air in the air inlet to the water mister and the temperature of water in the water inlet to the water mister, and a water flow controller for controlling the flow to the water mister in accordance with the sensed temperatures of the air and water in the inlets to the water mister to supply humidified air to the compressor.

BRIEF DESCRIPTION OF THE DRAWINGS

FIG. 1 is a schematic representation of a control system for humidifying air supplied to a compressor inlet of a gas turbine power plant in accordance with a preferred embodiment of the present invention.

DETAILED DESCRIPTION OF THE INVENTION

A system, generally designated 100, for controlling the humidification of inlet air entering a compressor is illustrated in FIG. 1. The humidification system 100 has the following process inputs: ambient air via stream 101 and water via stream 102. The process outputs are humidified air via stream 103 for flow to the inlet of a compressor 104 and excess water, if any, via stream 105 that is not vaporized after the humidification process and before entry to the compressor 104. Also illustrated are a turbine 106 and a generator 107. Gas turbine 106, as conventional, drives generator 107 to generate electricity.

Water entering the process via stream 102 is split into a plurality of streams, e.g., four streams each controlled by a separate pump. Thus, pump 108 pumps water via stream 112, pump 109 pumps water via stream 113, pump 110 pumps water via stream 114, and pump 111 pumps water via stream 115. Each pump is a different size, and the total flow rate of the water to the process can be controlled accordingly. For example, pump 109 may be twice the size of pump 108, pump 110 may be twice the size of pump 109, and pump 111 may be twice the size of pump 110. Additionally, the largest pump, e.g., pump 111, may be a variable speed pump. Although pumps 108, 109 and 110 may also be variable speed pumps, a preferred embodiment of the present invention uses combinations of pumps to control the total flow rate of water in stream 102 and hence the magnitude of the water supplied through the misters or nozzles 116–119 and to the compressor inlet. TABLE 1 shows the relative flow rate units using various combinations of pumps in accordance with a preferred embodiment.

TABLE 1

| Pump(s) in Operation | Flow Rate Units |
|---|---|
| Pump 108 | 1 |
| Pump 109 | 2 |
| Pump 108, Pump 109 | 3 |
| Pump 110 | 4 |
| Pump 108, Pump 110 | 5 |
| Pump 109, Pump 110 | 6 |
| Pump 108, Pump 109, Pump 110 | 7 |
| Pump 111 | 8 |
| Pump 108, Pump 111 | 9 |
| Pump 109, Pump 111 | 10 |
| Pump 108, Pump 109, Pump 111 | 11 |
| Pump 110, Pump 111 | 12 |
| Pump 108, Pump 110, Pump 111 | 13 |
| Pump 109, Pump 110, Pump 111 | 14 |

TABLE 1-continued

| Pump(s) in Operation | Flow Rate Units |
|---|---|
| Pump 108, Pump 109, Pump 110, Pump 111 | 15 |

As shown by TABLE 1, this system supplies water at flow rates in increments equal to one-fifteenth of the total flow rate using a binary-type method of counting, because each combination of pumps generates a unique flow rate. Additionally, since the largest pump, e.g., pump 110, has variable speeds, the flow rate may be varied arbitrarily. In this way, the flow rate of water in stream 102 can be set to any value between the maximum capacity of the pumps and one-half the capacity. Flow rates less than one-half the maximum capacity can be set equal to increments of the smallest pump, e.g., pump 108.

From pump 108, water via stream 112 flows to misters or misting nozzles 116. Similarly, water via stream 113 flows from pump 109 to misters or misting nozzles 117, water via stream 114 flows from pump 110 to misters or misting nozzles 118, and water via stream 115 flows from pump 111 to misters or misting nozzles 119. Each misting nozzle creates a fine spray of water, allowing the ambient air via stream 101 to entrain the droplets of water from nozzles 116, 117, 118, and 119. From the misting nozzles, the humidified air via stream 103 flows past a collector 130 that collects water in liquid form in stream 105. The water may be from water that either did not evaporate or condensed after evaporating. Collector 130 prevents water in liquid form from entering the compressor 104. Knowing the flow rate of water via stream 105 enables a more accurate calculation of water retained in stream 103.

The relative humidity of humidified air in stream 103 is varied using only the flow rate of water in stream 102. An operator sets the desired relative humidity of air in stream 103, and water flow controller 120 operates pumps 108, 109, 110, and 111 to set the appropriate flow rate of water added to air in stream 101 to obtain that desired flow rate. Heat- and mass-transfer processes are analyzed, which have been modeled by using Film Theory. A number of variables are used to calculate the desired aggregate flow rate of water. However, no temperature measurements of the humidified air in stream 103 are used. Accordingly, the determined flow rate of water, based on heat- and mass-transfer processes, is more accurate than prior art processes.

The water flow controller uses measurements of humidified air flow rate and temperature in controlling the humidification process. The total flow rate of humidified air via stream 103 provided compressor 104 is determined by extrinsic factors, e.g., the load on the power plant, the ratio of fuel to air, etc. Thus, water flow controller 120 only uses flow sensor 121 to measure the flow rate of humidified air via stream 103. The summation of the measurements made by flow sensors 122, 123, 124, and 125 equal the flow rate of water in stream 102. Flow sensors 122, 123, 124 and 125 measure the flow rates of water in streams 112, 113, 114 and 115, respectively. Alternatively, a single flow meter in stream 102 can be used. Flow sensor 126 measures the flow rate of water in stream 105 flowing from collector 130 and provides a signal to the controller 120. The water flow controller 120 reduces the flow rate of water via stream 102 appropriately in accordance with the magnitude of water not evaporated or condensed prior to entry of the humidified air to the compressor inlet. The amount of water that can be vaporized in stream 103 in the available distance before reaching compressor 104 depends on multiple factors, including the flow rate of water in stream 102, the diameter distribution of water droplets generated by misters or nozzles 116, 117, 118, and 119, the flow rate of air in stream 101, the velocity of air via stream 101, and the humidity of the air in stream 101. The diameter distribution of droplets remains substantially constant over time if no fouling of the misters 116, 117, 118, and 119 occurs. The velocity of air in stream 101 may be determined by dividing the volumetric flow rate of air by the cross-sectional area of stream 101. The humidity of air in stream 101 is determined using the wet-bulb and dry-bulb temperature sensors in stream 101.

Dew point sensor 127 measures the dew point temperature of the air in stream 101. Dry-bulb thermometer 128 measures the dry-bulb temperature of the air in stream 101. A psychrometric chart at a pressure of one atmosphere may be used to determine the humidity ratio of air in stream 101, among other properties like relative humidity and enthalpy. Sensor, i.e., thermometer, 129 measures the temperature of the water in stream 102. The heat-transfer process is approximately adiabatic. Therefore, the thermal energy of the water and the thermal energy of the air in stream 101 supply the energy required to vaporize the water in streams 112, 113, 114, and 115. The energy in stream 101 is known from the enthalpy of dry air and water vapor in stream 101 which can be determined from the psychrometric chart and the flow rate of dry air and the humidity ratio in stream 101. The flow rate of dry air in stream 101 is equal to the measured flow rate of dry air in stream 103. The total flow rate of evaporated water can be determined using the flow rates of water in streams 112, 113, 114, and 115, and the flow rate of water in stream 105. The energy in water stream 102 is known, because the flow rate and the temperature of water in stream 102 are known. The temperature of the water in stream 102 determines the enthalpy of the water, and atmospheric pressure determines the latent heat of vaporization of the water. The temperature of the humidified air in stream 103 is generally cooler than the temperature of the air in stream 101, because the evaporation of water uses thermal energy of the air in stream 101. Assuming the humidified air in stream 103 has come to thermal equilibrium, i.e., the water droplets in the air have evaporated, the appropriate flow rate of water via stream 102 can be determined using an iterative process.

The appropriate flow rate of water via stream 102 is determined iteratively, because the heat- and mass-transfer processes are interdependent. The amount of water that should be misted to obtain a predetermined relative humidity within the available distance depends on mass-transfer parameters, such as the flow rate of the water through misters or nozzles 116–119 and the temperature of the humidified air in stream 103. The mass-transfer process depends on the temperature of the water as a consequence of the vapor pressure of water. When the air via stream 103 is saturated, i.e., at one hundred percent relative humidity, increasing the flow rate of water via stream 102 cannot increase the relative humidity of the air. Additionally, the heat-transfer process depends on the flow rates of the evaporated water as a consequence of the temperature of the water. Thus, the heat-transfer process alters the mass-transfer process, and vice-versa. Although Film Theory connects the two processes, the appropriate flow of water via stream 102 to obtain a predetermined relative humidity in stream 103 within the available distance cannot be obtained directly. Therefore, iterations are performed until the calculations converge on a value for flow of water via stream 102 corresponding to a resulting relative humidity of the humidified air via stream 103.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a control system for a water mister in a gas turbine having a compressor, an inlet to the water mister for receiving ambient air and an inlet to the water mister for receiving water, a method for providing air humidified by the water mister to the compressor, comprising the steps of:
   (a) measuring the dry bulb temperature of the ambient air upstream of the water mister;
   (b) measuring the temperature of the water supplied to the water mister inlet;
   (c) measuring the flow rate of dry air to the compressor;
   (d) measuring one of a dew point temperature, a wet bulb temperature and relative humidity of the ambient air upstream of the water mister; and
   (e) controlling the flow rate of water supplied to the water mister to humidify air supplied to the compressor to a predetermined relative humidity in accordance with the measurements of steps (a)–(d).

2. A method according to claim 1 including measuring the dew point temperature of the ambient air upstream of the mister.

3. A method according to claim 1 including measuring the wet bulb temperature of the ambient air upstream of the water mister.

4. A method according to claim 1 including measuring the relative humidity of the ambient air upstream of the water mister.

5. A method according to claim 1 including determining the flow rate of any water removed from the flow of humidified air to the compressor.

6. A method according to claim 5 including adjusting the flow rate of the water supplied to the water mister in accordance with the flow rate of water removed from the flow of humidified air to the compressor.

* * * * *